United States Patent Office

3,471,567
Patented Oct. 7, 1969

3,471,567
PREPARATION OF GLYOXAL
George Gourlay, Stevenston, Scotland, assignor to Imperial Chemical Industries Limited, London, England, a corporation of Great Britain
No Drawing. Filed Sept. 5, 1967, Ser. No. 665,229
Claims priority, application Great Britain, Sept. 22, 1966, 42,370
Int. Cl. C07c 45/02, 47/12
U.S. Cl. 260—604                    20 Claims

ABSTRACT OF THE DISCLOSURE

Glyoxal preparation involves the catalytic oxidation of ethylene using nitric acid. The catalyst used here is a mixture of a lithium salt and palladium, and a much faster and more efficient reaction takes place.

---

This invention relates to a process for the preparation of glyoxal and to glyoxal produced thereby.

It has been proposed to prepare glyoxal by oxidising ethylene with aqueous nitric acid in presence of a palladium catalyst. This reaction is, however, slow, even at the maximum catalyst concentration, and is relatively inefficient because it is accompanied by wasteful side reactions wherein the glyoxal formed is itself oxidised.

Generally it takes from 5 to 8 hours for complete reaction and the glyoxal yield corresponds only to 60–65% by weight conversion of the ethylene reacted. Clearly it is desirable to speed up the reaction to obtain an increased glyoxal yield.

It is an object of this invention to provide a process whereby ethylene may be oxidised to glyoxal at a faster rate and more efficiently.

In accordance with the invention glyoxal is prepared by the oxidation of ethylene by nitric acid in aqueous medium in presence of a catalytic mixture of a water-soluble lithium salt and palladium metal or a palladium compound. Using this process the reaction may be completed in about 2 hours and yields corresponding to 80% by weight conversion of the reacted ethylene are obtainable.

The catalyst mixture may be prepared by the addition of lithium salt to palladium or the palladium compound in the aqueous nitric acid. The preferred lithium salts are lithium chloride and lithium nitrate but other salts such as, for example, the nitrite, sulphate or carbonate may be used. Preferably the palladium is used in the form of a divalent palladium salt such as, for example, palladous chloride, palladous nitrate or palladous sulphate. It is believed that in the reaction the lithium salt forms a complex with the palladium and this complex is a more effective catalyst than the original palladium or palladium compound because it is much more soluble and enables higher concentrations of disolved palladium to be obtained in the reaction mixture.

The concentration of palladium metal or compound is preferably in the range 0.01 to 2% by weight of the reaction mixture. The lithium salt is preferably present in an amount substantially equimolar to the amount of palladium. Addition of a little sodium nitrite to the reaction mixture has been found to facilitate solution of the catalyst in the reaction mixture. Preferably the molar quantity of sodium nitrite should be less than the molar quantity of the lithium salt.

The reaction is preferably carried out using technically pure ethylene. A mixture of ethylene with other gases, for example ethylene-ethane mixtures, can be used although it is preferred that other olefines should not be present in large amounts, as the purity of the product glyoxal is adversely affected by their presence.

The reaction may conveniently be carried out in aqueous nitric acid of between 1% and 60% by weight concentration, best results being obtained when concentrations of between 10% and 25% by weight are used. Nitrogen dioxide, or a mixture of nitric oxide with excess oxygen may be used to replace the consumed nitric acid, and thereby permit oxidation of further quantities of ethylene to obtain higher concentrations of glyoxal in the reaction mixture and consequently to facilitate further concentration of the glyoxal.

The process may conveniently be operated either as a batch process wherein a stream of ethylene is passed through a mixture comprising aqueous nitric acid and catalyst, or by a continuous process wherein ethylene and nitric acid or oxides of nitrogen are continuously fed into the aqueous reaction medium and the reaction medium is continuously bled off, the catalyst being recovered and returned to the reaction medium. The emergent gas stream containing unreacted ethylene may conveniently be re-cycled to raise the overall conversion of ethylene. By-product acetaldehyde and nitrous oxide are preferably removed from the emergent gas stream before re-cycling the ethylene to the reactor.

The glyoxal produced by the process of the invention may be used directly in industrial applications as the aqueous solution first produced or, if desired, it may be purified by one of several methods and concentrated by distillation. Treatment with ethylene precipitates most of the palladium of the catalyst, and the remaining palladium may be removed by absorption by active carbon, charcoal, or polyacrylonitrile, by precipitation on neutralisation of the reaction mixture with calcium carbonate or by ion-exchange methods. Ion-exchange methods may also be used to recover the lithium of the catalyst. Alternatively, all the metallic impurities may be removed by flash distillation of the crude solution to give a purified aqueous glyoxal distillate and a residue containing the catalyst for recovery. Alternatively, all the ionic impurities may be removed by treatment of the glyoxal solution by electrodialysis.

The invention is further illustrated by the following examples in which all parts and percentages are by weight.

EXAMPLE 1

A glass reactor fitted with a stirrer was charged with a mixture of 1,000 parts of 25% aqueous nitric acid and 2.5 parts of palladous chloride. Ethylene was passed through the mixture at 40° C. at a rate of 180 parts per hour and initially palladium metal was precipitated. 0.65 parts of lithium chloride were added and the palladium rapidly dissolved. The emergent gas stream was shown by gas-liquid chromatography to contain acetaldehyde and nitrous oxide in addition to unreacted ethylene. After five hours most of the palladium precipitated from the solution indicating that the nitric acid was consumed and the reaction completed. 44 parts of ethylene had been absorbed and the reaction mixture contained 73 parts of glyoxal (estimated by reaction with cyclohexylamine to precipitate the Schiff's base and estimating the unreacted cyclohexylamine, as described by F. Beck and O. Grass, Zeitschrift Für Analytische Chemie 147, 9–12 (1955)), corresponding to a yield of 80% of the theoretical value with respect to absorbed ethylene. The lithium chloride and the remaining complex palladium salts were recovered by passing the reaction mixture through separate anion ($CO_3^{2-}$) and cation ($H^+$) exchange resin columns. The resulting glyoxal solution was purified and concentrated by vacuum (50 mm. Hg) distillation to give a 40% aqueous solution of sufficient purity for normal uses.

EXAMPLE 2

2.5 parts of palladous chloride were added to 1,000 parts of a 33% aqueous solution of nitric acid at 30° C. and ethylene was passed through the mixture at the rate of 180 parts per hour as described in Example 1. 0.65 parts of lithium chloride were then added and the palladium which had been precipitated dissolved rapidly. After 7 hours reaction was complete. 36 parts of ethylene had been absorbed and the reaction mixture contained 58 parts (75% of theoretical) of glyoxal. The palladium and lithium salts were recovered by precipitation and ion-exchange, as described in Example 1. The glyoxal solution was purified and concentrated by distillation to give an approximately 40% aqueous solution.

EXAMPLE 3

9 parts of palladium chloride were added to 1,000 parts of 21% aqueous nitric acid and ethylene was passed through the mixture at a rate of 180 parts per hour at 40° C. 2.1 parts of lithium chloride were added and the palladium which had been precipitated dissolved rapidly. After 2 hours reaction was complete. 37.5 parts of ethylene had been absorbed and the solution contained 69 parts (89% theoretical) of glyoxal. The palladium and lithium salts were recovered as described in Example 1. The glyoxal solution was concentrated by distillation.

EXAMPLE 4

9 parts of palladous chloride were added to 1,000 parts of 21% aqueous nitric acid and ethylene was passed through the mixture at a rate of 180 parts per hour at 35° C. 4.2 parts of lithium chloride were added and the palladium which had been precipitated dissolved rapidly. After 4 hours the reaction was complete. 38.2 parts of ethylene were absorbed and the reaction mixture contained 75 parts (95% theoretical) of glyoxal. The palladium and lithium salts were recovered and the glyoxal solution concentrated as described in Example 1.

EXAMPLE 5

18 parts of palladous chloride were added to 1,000 parts of 15% aqueous nitric acid and ethylene was passed through at 50° C. at a rate of 180 parts per hour. 8.4 parts of lithium chloride were added, followed by 2 parts of sodium nitrite and the palladium dissolved rapidly. After 40 minutes reaction was complete. 22 parts of ethylene had been absorbed and the reaction mixture contained 41 parts (90% theoretical) of glyoxal. The palladium, lithium and sodium salts were removed by precipitation and ion-exchange as described in Example 1. The glyoxal solution was concentrated by distillation.

EXAMPLE 6

9 parts of palladium chloride were added to 1,000 parts of 21% aqueous nitric acid and 180 parts per hour of ethylene, 30 parts per hour of oxygen and 30 parts per hour of nitric oxide in admixture at 40° C. were passed through the reaction mixture. 2.- parts of lithium chloride were added and the palladium which had been precipitated dissolved rapidly. After 3 hours the reaction mixture contained 105 parts of glyoxal corresponding to a yield of 85% of the theoretical value with respect to absorbed ethylene. Most of the palladium was precipitated by stopping the flow of nitric acid and oxygen and passing ethylene only through the reaction mixture. The palladium was filtered off and the lithium chloride and complex palladium salts were recovered and the glyoxal solution concentrated as described in Example 1.

EXAMPLE 7

A stirred reactor charged with 1,000 parts of 20% aqueous nitric acid containing 8 parts of palladium and 2.1 parts of lithium chloride was fitted with a dropping funnel containing the same mixture. Ethylene was passed through the reaction mixture in the reactor at a rate of 180 parts per hour. After 1½ hours the reaction mixture was lowly drawn off in a continuous manner at a rate of 500 parts per hour for 4 hours. The mixture from the dropping funnel was added continuously at the same rate as the reaction mixture was removed. 93 parts of ethylene were absorbed in the reaction. The removed reaction mixture contained (on average) 5.5% of glyoxal (80% theoretical) and was purified as described in Example 1. The palladium and lithium chloride were recovered as described in Example 1 and were re-used in the reaction.

EXAMPLE 8

2.44 parts of palladous nitrate were added to 180 parts of a 20% aqueous solution of nitric acid at 35° C. and ethylene was passed through the mixture at a rate of 25 parts per hour as described in Example 1. 1.1 parts of lithium nitrate trihydrate and 0.62 parts of sodium nitrate were then added and the palladium which had been precipitated dissolved rapidly. After 140 minutes reaction was complete. 6.4 parts of ethylene had been absorbed and the reaction mixture contained 11.15 parts of glyoxal (84% of theoretical). Most of the palladium precipitated from the solution and was filtered off. The glyoxal solution was purified by dropwise addition to stirred dimethyl polysiloxane (non-volatile fluid) at approximately 140° C. and at a pressure of 15–30 mm. and condensing the distillate as purified aqueous glyoxal. Palladium, lithium and sodium salts were recovered from the non-volatile fluid by extraction with nitric acid.

EXAMPLE 9

2.44 parts of palladous nitrate were added to 180 parts of a 20% aqueous solution of nitric acid at 35° C. and ethylene was passed through the mixture at a rate of 25 parts per hour as described in Example 1. 0.38 parts of lithium chloride and 0.62 parts of sodium nitrite were then added and the palladium which had been precipitated dissolved rapidly. After 210 minutes reaction was complete. 6.2 parts of ethylene had been absorbed and the reaction mixture contained 11.1 parts (87% of theoretical) of glyoxal. Most of the palladium precipitated from the solution and was filtered off. The glyoxal solution was purified by electrodialysis in a five compartment cell using phosphate buffer solutions at pH 7 in the outer electrode compartments, 1.0 N aqueous sodium chloride in the inner compartments and the aqueous glyoxal in the centre compartment, the compartments being separated by alternate cationic and anionic membranes. Lithium cations concentrated in one of the inner compartments and complex palladium anions concentrated in the other, leaving the centre compartment de-ionised. The lithium and palladium-containing solutions obtained were suitable for re-cycling in the process.

EXAMPLE 10

1.93 parts of palladous sulphate were added to 180 parts of a 20% aqueous solution of nitric acid at 35° C. and ethylene was passed through the mixture at a rate of 25 parts per hour as described in Example 1. 0.38 parts of lithium chloride and 0.62 parts of sodium nitrite were then added and the palladium which had been precipitated dissolved rapidly. After 5 hours the reaction was complete. 6.05 parts of ethylene had been absorbed and the reaction mixture contained 9.8 parts of glyoxal (78% of theoretical). Most of the palladium precipitated from the solution and was filtered off. The glyoxal solution was purified by passage through a bed of active carbon, and through cationic and anionic resin exchange columns as described in Example 1, and finally concentrated by distillation under reduced pressure.

EXAMPLE 11

1.6 parts of palladous chloride were added to 180 parts of a 20% aqueous solution of nitric acid at 35° C. and ethylene was passed through the mixture at a rate of 25 parts per hour as described in Example 1. 1.1 parts of lithium nitrate and 0.62 parts of sodium nitrite were then added and the palladium which had been precipitated dissolved rapidly. After 4¼ hours the reaction was complete. 6.0 parts of ethylene had been absorbed and the reaction mixture contained 11.35 parts of glyoxal (92% of theoretical). Most of the palladium precipitated from the solution and was filtered off. The filtrate was neutralised to pH 7 by the addition of calcium carbonate, and the resultant precipitate of calcium salts of organic acids and further palladium was filtered off before final purification of the glyoxal solution by ion-exchange resins and concentration by distillation under reduced pressure, as described in Example 1.

EXAMPLE 12

1.6 parts of palladous chloride were added to 180 parts of a 20% aqueous solution of nitric acid at 35° C. and ethylene was passed through the mixture at a rate of 25 parts per hour as described in Example 1. 0.33 parts of lithium carbonate and 0.62 parts sodium nitrite were then added, and the palladium which had been precipitated dissolved rapidly. After 6½ hours the reaction was stopped. 6.2 parts of ethylene had been absorbed and the reaction mixture contained 11.1 parts (87% of theoretical) of glyoxal. The solution was purified by addition of calcium carbonate and ion-exchange treatment as described in Example 11.

EXAMPLE 13

1.6 parts of palladous chloride were added to 180 parts of a 20% aqueous solution of nitric acid at 35–40° C. and ethylene was passed through the mixture at a rate of 25 parts per hour as described in Example 1. 0.50 parts of lithium nitrite were then added and the palladium which had been precipitated dissolved rapidly. After 2¾ hours the reaction was complete.

6.4 parts of ethylene had been absorbed and the reaction mixture contained 11.9 parts of glyoxal (90% of theoretical). Most of the palladium precipitated from the solution and was filtered off. The solution was purified by addition of calcium carbonate and ion-exchange treatment as described in Example 11.

What we claim is:

1. A process for the preparation of glyoxal wherein ethylene is oxidised by nitric acid in aqueous medium in presence of a catalytic mixture of a water-soluble lithium salt and at least 0.01% by weight of the reaction mixture of a palladium metal or a palladium salt, the concentration of nitric acid being at least 10% by weight of the reaction mixture.
2. A process as claimed in claim 1 wherein the catalytic mixture is one prepared by the addition of lithium salt to palladium or a palladium compound in aqueous nitric acid.
3. A process as claimed in claim 1 wherein the lithium salt comprises chloride, nitrate, nitrite, sulphate or carbonate of lithium.
4. A process as claimed in claim 1 wherein the palladium is in the form of a divalent palladium salt.
5. A process as claimed in claim 4 wherein the palladium salt comprises palladous chloride, palladous nitrate or palladous sulphate.
6. A process as claimed in claim 1 wherein the concentration of palladium metal or compound is in the range 0.01 to 2% by weight of the reaction mixture.
7. A process as claimed in any one of claim 1 wherein the lithium salt is present in an amount substantially equimolar to the amount of palladium.
8. A process as claimed in claim 1 wherein the reaction mixture contains sodium nitrate.
9. A process as claimed in claim 8 wherein the molar quantity of sodium nitrite is less than the molar quantity of the ltihium salt.
10. A process as claimed in claim 1 wherein the nitric acid concentration is in the range 10% to 25% by weight.
11. A process as claimed in claim 1 wherein nitrogen dioxide or a mixture of nitric oxide and oxygen is used to replace the consumed nitric acid.
12. A process as claimed in claim 1 operated as a batch process wherein a stream of ethylene is passed through a mixture comprising aqueous nitric acid and catalyst.
13. A process as claimed in any one of claims 1 to 11 operated as a continuous process wherein ethylene and nitric acid or oxides of nitrogen are continuously fed into the aqueous reaction medium and the reaction medium is continuously bled off, the catalyst being recovered and returned to the reaction medium.
14. A process as claimed in claim 12 wherein the emergent gas stream is re-cycled to the reaction medium.
15. A process as claimed in claim 14 wherein by-product acetaldehyde and nitrous oxide are removed from the gas stream before re-cycling.
16. A process as claimed in claim 1 wherein palladium is removed from the glyoxal by treatment of the glyoxal with ethylene.
17. A process as claimed in claim 16 wherein the remaining palladium is removed by adsorption with active carbon, charcoal or polyacrylonitrile, by precipitation on neutralisation of the reaction mixture with calcium carbonate or by an ion-exchange method.
18. A process as claimed in claim 1 wherein the lithium of the catalyst is recovered by an ion-exchange method.
19. A process as claimed in claim 1 wherein the glyoxal is separated from the reaction medium by flash distillation.
20. A process as claimed in any one of claims 1 to 15 wherein ionic impurities are removed by electrodialysis of glyoxal solution.

References Cited

UNITED STATES PATENTS 3,333,004  7/1967  Platz et al. _____ 260—604 X
3,288,845  11/1966  Schaeffer _____ 260—604 X LEON ZITVER, Primary Examiner
R. H. LILES, Assistant Examiner U.S. Cl. X.R.

252—438, 440, 441, 472